United States Patent
Tanaka

(10) Patent No.: US 6,813,685 B1
(45) Date of Patent: *Nov. 2, 2004

(54) SYSTEM FOR STORING DATA AND METHOD OF CONTROLLING THE WRITING OF REDUNDANT DATA

(75) Inventor: Ryuta Tanaka, Kanagawa (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 826 days.

(21) Appl. No.: 09/042,334

(22) Filed: Mar. 13, 1998

(30) Foreign Application Priority Data

Oct. 17, 1997 (JP) .............................................. 9-285005

(51) Int. Cl.⁷ .............................................. G06F 12/16
(52) U.S. Cl. ................................. 711/114; 714/6; 710/6
(58) Field of Search ............................ 711/114; 714/6; 710/6

(56) References Cited

U.S. PATENT DOCUMENTS

| | | | |
|---|---|---|---|
| H1221 H | | 8/1993 | Best et al. |
| 5,515,500 A | * | 5/1996 | Mizuno et al. ............. 714/710 |
| 5,537,534 A | * | 7/1996 | Voigt et al. ................. 711/114 |
| 5,548,711 A | * | 8/1996 | Brant et al. ................. 711/114 |
| 5,720,025 A | * | 2/1998 | Wilkes et al. .................. 714/6 |
| 5,745,453 A | * | 4/1998 | Ikeda .......................... 360/48 |
| 5,883,909 A | * | 3/1999 | DeKoning et al. .......... 714/800 |
| 5,890,202 A | * | 3/1999 | Tanaka ....................... 711/111 |

FOREIGN PATENT DOCUMENTS

| | | |
|---|---|---|
| JP | 4127224 | 4/1992 |
| JP | 4228153 | 8/1992 |
| JP | 8152976 | 6/1996 |
| JP | 8249134 | 9/1996 |
| JP | 926854 | 1/1997 |

* cited by examiner

Primary Examiner—Reginald G. Bragdon
(74) Attorney, Agent, or Firm—Katten Muchin Zavis Rosenman

(57) ABSTRACT

A calculation and control unit monitors the transferred data in a data disk, calculates the parity of the transferred data, and writes the result of the operation in a memory. After the parity calculation of the transferred data in the data disk is completed, the calculation and control unit reports the termination to a CPU. Then, when receiving an instruction to write from the CPU, the calculation and control unit transfers the parity data to a redundant data disk and writes redundant data in the redundant data disk.

12 Claims, 15 Drawing Sheets

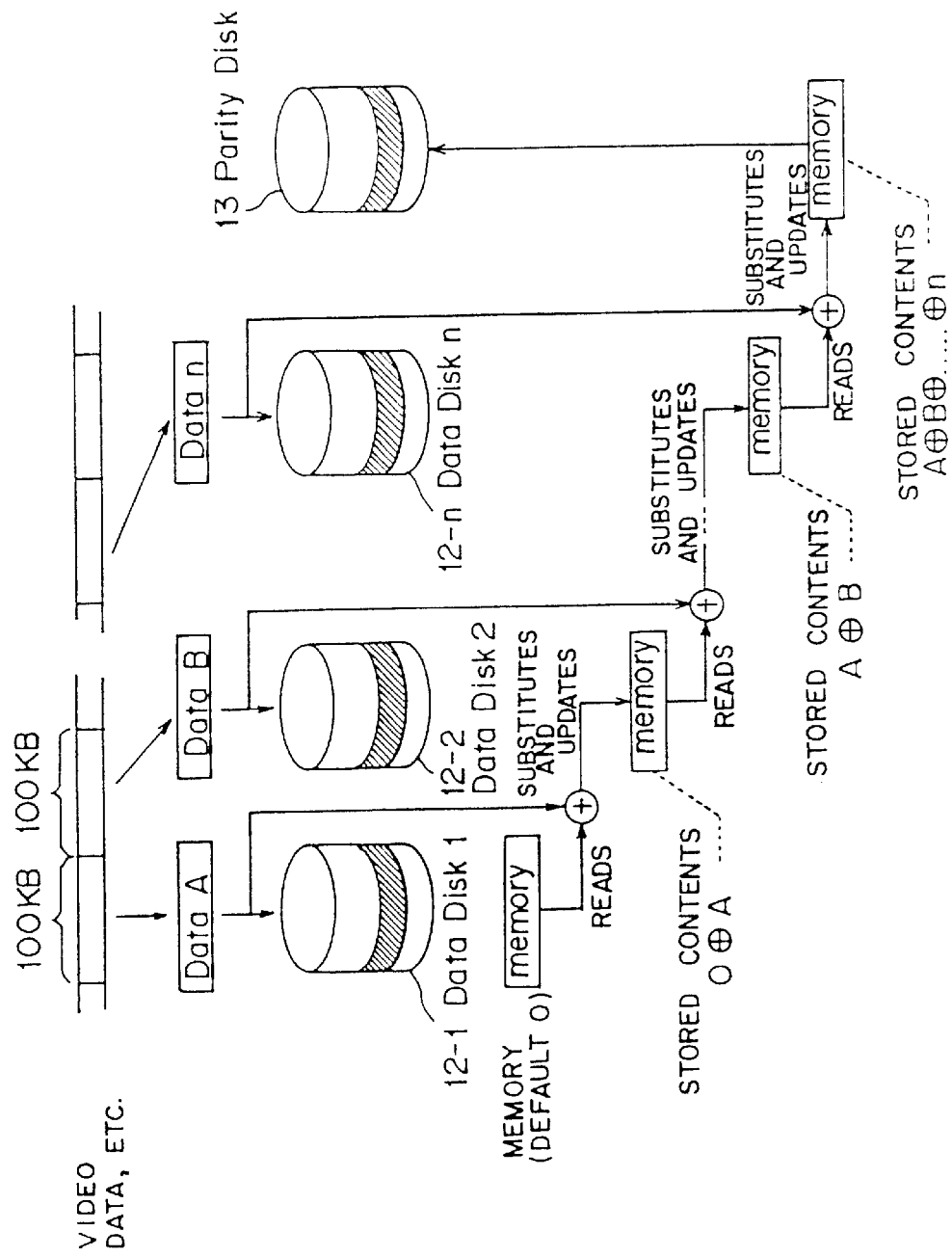
F I G. 2

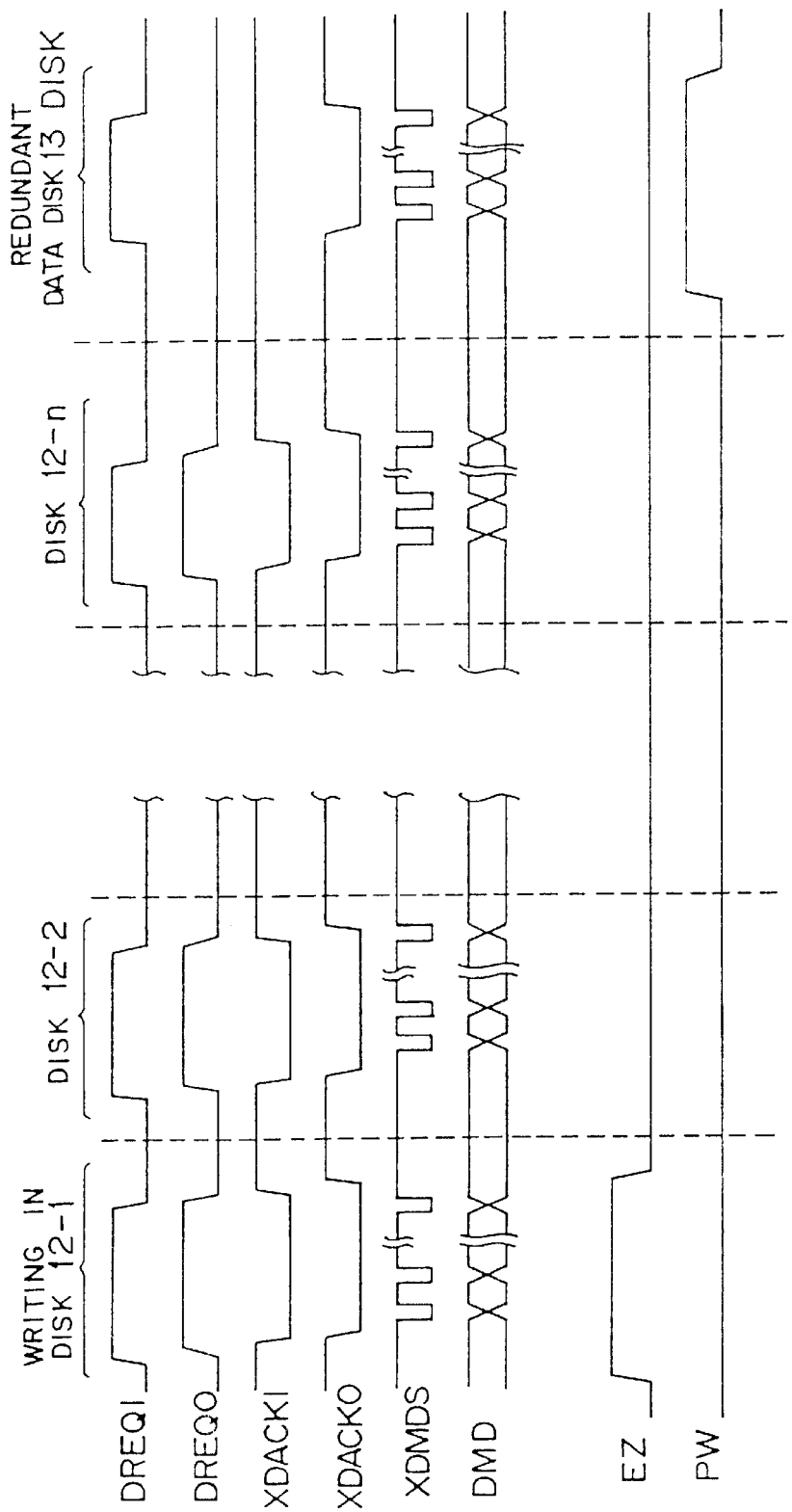
F I G. 15

SYSTEM FOR STORING DATA AND METHOD OF CONTROLLING THE WRITING OF REDUNDANT DATA

BACKGROUND OF THE INVENTION

1. Field of the Invention

The present invention relates to a system for storing data consisting of a plurality of data storing units, a controller for controlling the reading and writing of data and al redundant data storing unit for storing redundant data, and the method of controlling the writing of redundant data.

2. Description of the Related Art

To prevent video data and audio data which are provided to users in the field of multimedia from being interrupted, it is necessary that the consecutive accesses to data to be read and written should be guaranteed. A technology for accessing video data without interruption is widely used by a system such as video-on-demand for providing video images, etc. To provide these services it is necessary to take measures to cope with failures which might occur in such a system.

When constructing a system such as video-on-demand, etc., to provide many users with high-quality images, it is necessary to access data making the best use of the transfer efficiency of a bus for transferring the data, and to provide a parity disk for recovering without delay from a failure which might occur in the system.

As a technology for coping with the problems of high-speed access and reliability, the redundant array of inexpensive disks (RAID) is publicly known. In RAID, since parity calculation and the writing on a parity disk of parity data are automatically carried out, the timing in the use of a bus for writing the parity data cannot be controlled from the controller side for controlling the reading from and writing to a data storing unit of the data. For example, the writing on the parity disk of parity data has been carried out at the timing for accessing the data storing unit, and thereby the reading from the data storing unit of data or the writing to the data storing unit of data, has been disturbed. For this reason, the efficiency of the use of a bus must be reduced to cope with even the case where access to a parity disk occurs at an unexpected timing.

On the other hand, in the operation of a multimedia service such as video-on-demand, etc., since the access schedule of the data storing unit is complicated, and it is necessary to completely guarantee the predetermined schedule, it becomes a problem that a process such as the writing on the parity disk of parity data, etc. occurs at an unexpected timing.

SUMMARY OF THE INVENTION

It is an object of the present invention to implement the writing in a redundant data storing unit of redundant data without disturbing access to a data recording unit. It is another object of this invention to improve the efficiency of the use of a bus.

The data storing system of the present invention, consisting of a plurality of data storing units for storing data, a redundant data storing unit for storing the redundant data of the data written in the data storing unit and a controller for controlling the reading from and writing to the data storing unit of data, comprises a redundant data controller further comprising a calculating unit for calculating the redundant data of data written in the data storing unit and a redundant data storing unit for storing redundant data obtained by the calculating unit, and the controller controls the reading from and writing to the data storing unit of data and the writing in the redundant data storing unit of the redundant data obtained by the redundant data controller.

Since by adopting the present invention both the calculation of redundant data and the storing of the result of the calculation are carried out by a redundant data controller, and the control of both the writing in a redundant data storing unit of redundant data and the reading from and writing to a data storing unit of data are carried out by a controller, both accesses to the data storing unit and to the redundant data storing unit can be comprehensively controlled by the controller. Therefore, access to the data storing unit is prevented from being disturbed by the writing to the redundant data storing unit of redundant data. Furthermore, since both the accesses to the data storing unit and to the redundant data storing unit can be controlled by the controller, a high-density access schedule can be planned and maintained, by which ;the reliability of a system can be enhanced and the efficient of the use of a bus can be improved.

BRIEF DESCRIPTION OF THE DRAWINGS

FIG. 2 explains the operations ranging from parity calculation to the writing on a redundant data disk.

FIG. 15 is a chart showing the timing at the time of writing on data disks 12-1 to 12-n of data and writing on a redundant data disk 13 of parity data.

DESCRIPTION OF THE PREFERRED EMBODIMENT

Figure 1:
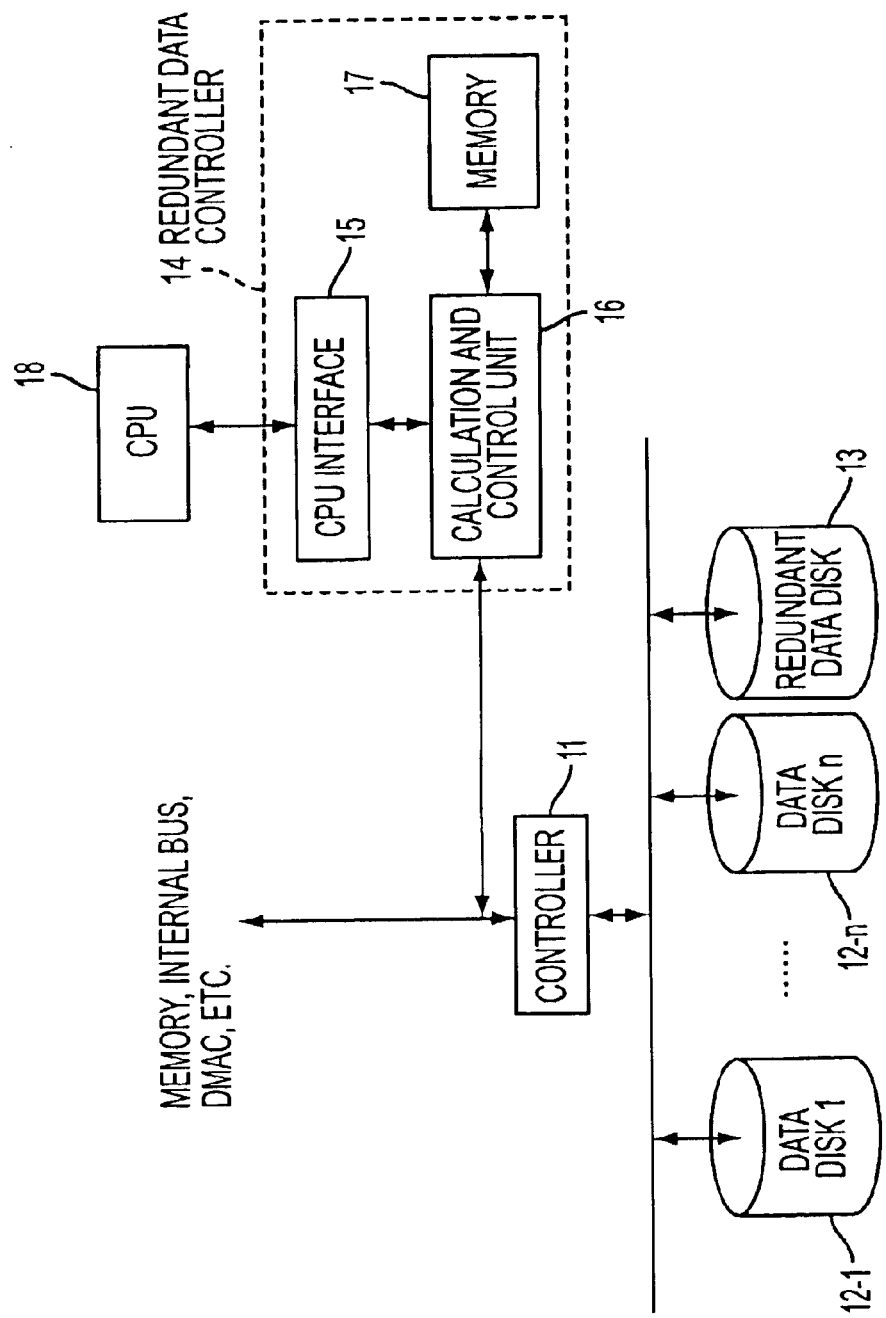
FIG. 1 shows the system configuration of a data storing system.

The embodiment of this invention is described below with reference to the drawings. FIG. 1 is the block diagram of a data storing system of the embodiment of this invention.

A controller 11 is connected to a memory, DMA controller, etc., which are not shown in the drawing, through an internal bus, and controls the reading of the data stored in data disks 12-1 through 12-n and also the writing of data.

A CPU 18 (data controller) is connected to the internal bus, and instructs the controller 11 to read or write data and further instructs a redundant data controller, described later, to write redundant data on a redundant data disk 13.

In the data disks 12-1 through 12-n, for example, consecutive data such as video data, etc. are divided and stored in units of certain blocks in order. The redundant data disk 13 stores redundant data in order to reproduce the data if a failure occurs.

The redundant data controller 14 comprises a CPU interface 15, a calculation and control unit 16 and a memory 17. The calculation and control unit 16 monitors data during transfer, calculates the creation of parity data, and writes the obtained parity data in the memory 17. When the parity calculation of data in the data disks 12-1 through 12-n is completed, the calculation and control unit 16 also reports the termination of the parity calculation to the CPU 18 through the CPU interface 15. Then, when receiving an instruction to write the parity data on the redundant data disk 13 from the CPU 18, the calculation and control unit 16 transfers the parity data to the controller 11, and writes the data on the redundant data disk 13.

Next, in the data storing system having the above-mentioned configuration, the operations ranging from parity calculation to the writing on the redundant disk 13 of the result of the operation in the redundant data controller 14 are described below with reference to FIG. 2.

If the data size of one block of data written in each of the data disks 12-1 through 12-n is assumed to be 100 Kbytes, the memory 17 of the redundant data controller 14 has a memory capacity of 100 Kbytes to store one block of parity data.

As shown in FIG. 2, when data are written on the data disk 12-1 in the first place, the calculation and control unit 16 calculates the exclusive-OR of the 100 Kbytes of data and the default "0", and writes the result of the operation to the memory 17, since the calculation and control unit 16 monitors data transferred through a bus. That is, the data written in the memory in the first place is the 100 Kbytes of data themselves written on the data disk 12-1. When the next 100 Kbytes of data are written on the data disk 12-2, these 100 Kbytes of data are also monitored by the calculation and control unit 16, the exclusive-OR of the 100 Kbytes of data and the data read from the memory 17 is calculated, and the result of the operation is substituted in the memory 17. After this, the exclusive-OR of the 100 Kbytes of data written on each of the data disks 12-3, . . . 12-n and the data read from the memory 17 is calculated and substituted in the memory 17. In this way, every time, the exclusive-OR of the data written in the next data disk and the parity data in the memory 17 is calculated, the data in the memory is updated.

When the calculation of both the data written in the n-th data disk 12-n and the parity data in the memory 17 is completed, the calculation and control unit 16 reports tot the CPU 18 through the CPU interface 15 that the calculation of the parity data for the n set of data disks is completed. When the report is received from the redundant data controller 14 that the calculation of the parity data for the n set of data disks is completed, the CPU 18 instructs the redundant data controller 14 to write the parity data in memory 17 on the redundant data disk 13 while there is no access being made to the data disks 12-1 through 12-n.

Next, an example of the control method of the access schedule for data disks 12-1 through 12-n by a CPU 18 is described below.

Figure 3:
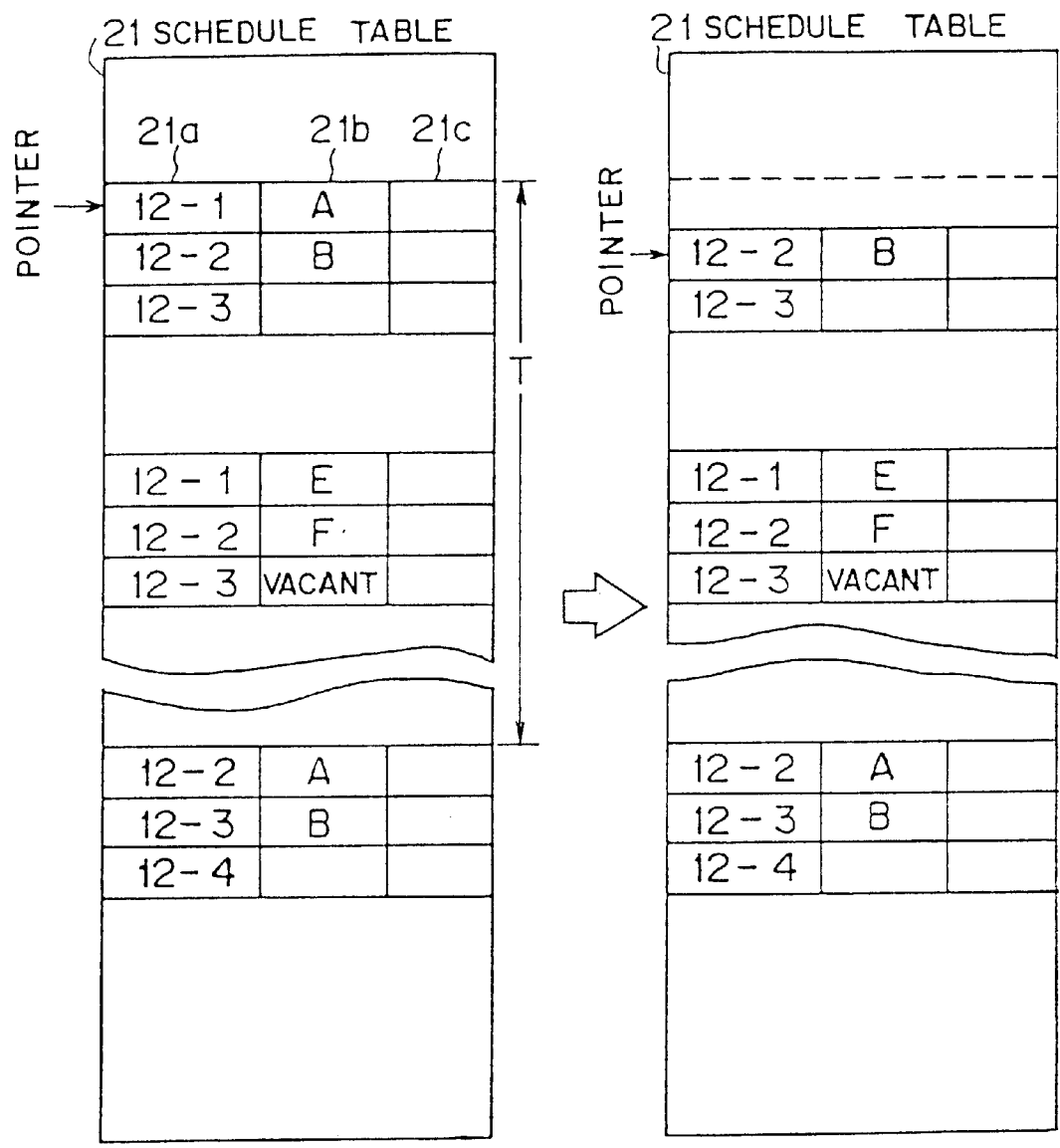
FIG. 3 explains a schedule table 21.

FIG. 3 explains the schedule table 21 in which data disks 12-1 through 12-n and the requester of an access are matched with each other.

A schedule table 21 comprises a disk designating information storing area 21a for storing disk designating information for designating a data disk being an access destination, a user designating information storing area 21b for storing information for indicating a user being an access requester, and a storage position storing area 21c for storing information for indicating the data storage position in a data disk.

The schedule table 21 shown in FIG. 3 indicates that data disks 12-1 and 12-2 are set for the access destinations of users A and B, respectively, and that a data disk 12-3 is vacant. Then, the schedule table 21 also indicates that in the next cycle after one access cycle of data disks 12-1 through 12-n a data disk 12-3 is vacant. That is, a vacant period equivalent to two slots is provided for the data disk 12-3.

Figure 4:
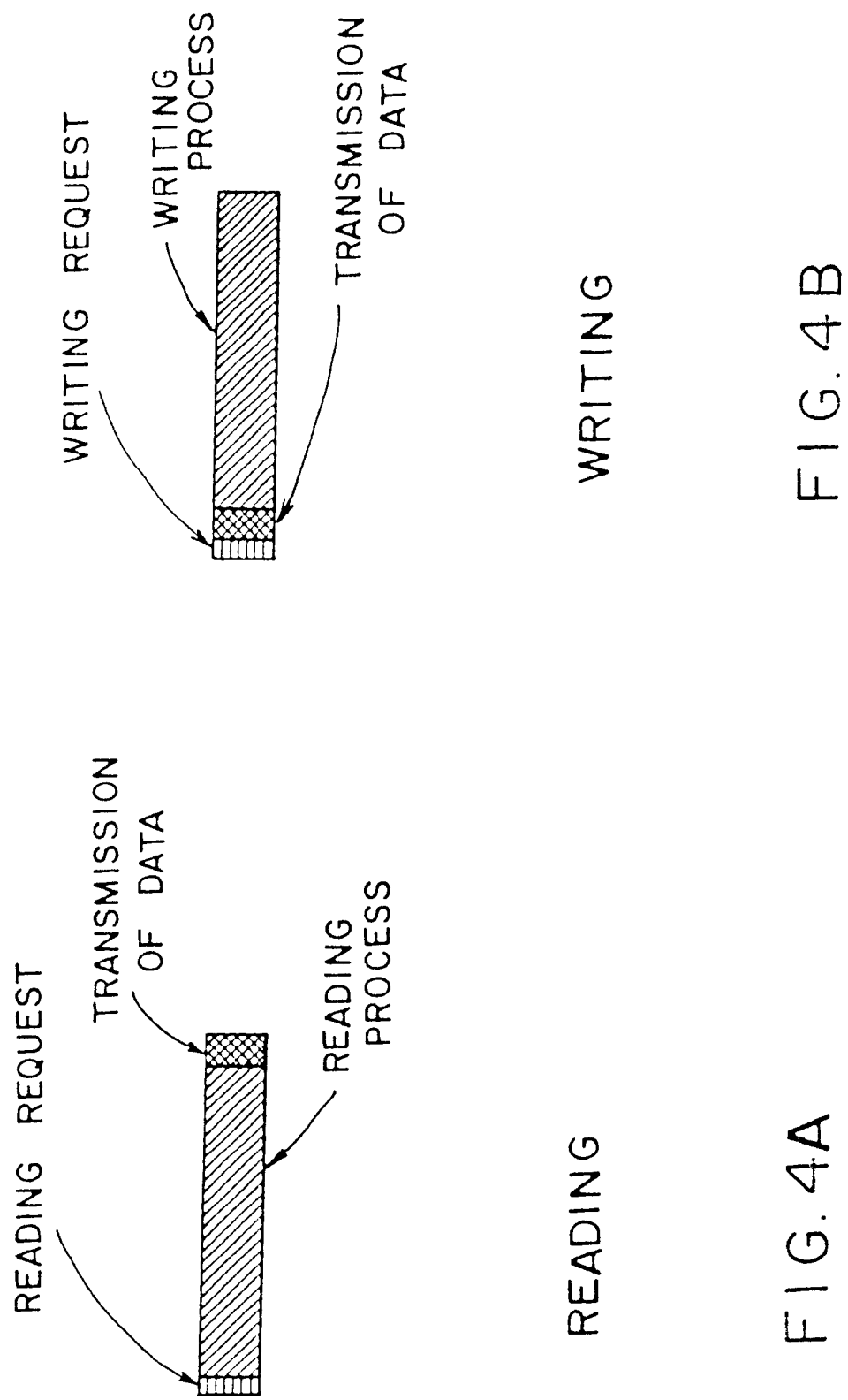
FIGS. 4A and 4B show reading and writing slots, respectively.

As shown in FIGS. 4A and 4B, a slot means a period from when a reading request is issued from the CPU 18 to a bus until the reading from data disks 12-1 through 12-n of one block of data is completed, or a period from when a writing request is issued until the writing in data disks 12-1 through 12-n of one block of data is completed., Here, the former, that is, the reading slot, is used as a standard slot of the schedule table 21.

As described above, in this embodiment a vacant period equivalent to at least two reading slots is provided for a data disk 12-3 in the schedule table 21, which is done so that the writing of parity data may be carried out without affecting the access schedule of data disks 12-1 through 12-n by writing parity data on a redundant data disk, described later, using the vacant period. In the above-mentioned embodiment, since the reading of data and the writing of data are mixed, two reading slots are provided. However, when only the writing of data is carried out, it is acceptable if a vacant period equivalent to only one writing slot is provided. Provided, however, that a period from when a writing request is issued until the writing of one block of data is completed, is defined as one slot.

In the schedule table 21 shown in FIG. 3, an access cycle T indicates a period from when a data disk designated as the access destination of a user A, for example, a data disk 12-1, is accessed, until a data disk 12-2 designated as the next access destination of the same user A is accessed, and by modifying the access cycle T the transfer rate of data can be changed.

Figure 5:
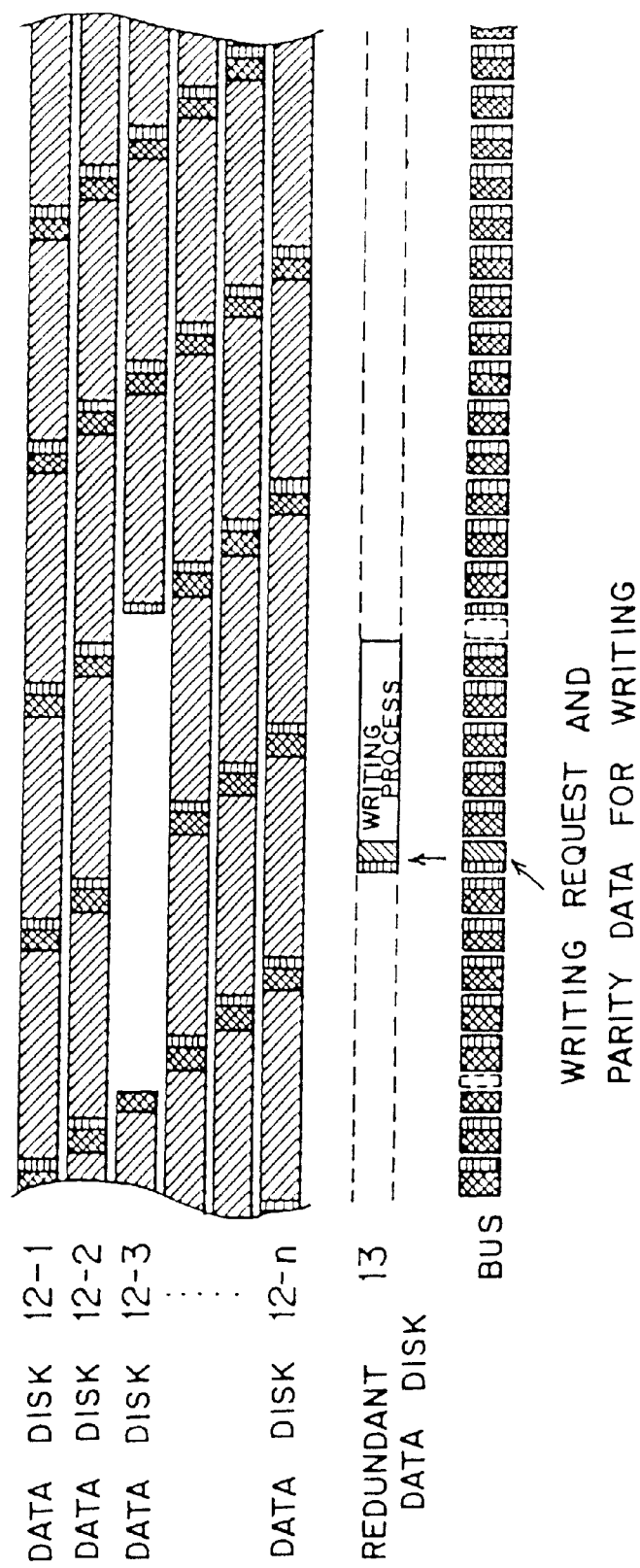
FIG. 5 shows the access timing in the case where reading and the writing of parity data are carried out.

Next, FIG. 5 show s the access timing in the case where the reading from data disks 12-1 through 12-n of data and the writing of parity data are carried out.

With the timing shown in FIG. 5, when the CPU 18 issues a reading request to read from a data disk 12-1, the reading from the relevant data disk 12-1 of one block of data is performed, and after the reading process in the data disk 12-1 is completed, the one block of data is sent out to a bus.

In this example, a vacant period equivalent to two reading slots is provided for a data disk 12-3. Although not shown in the drawing, after an access cycle T, a vacant period equivalent to two slots is provided for the next data disk 12-4, and after this, after every access cycle T, a vacant period equivalent to two reading slots is provided for each of the data disks 12-4, 12-5, . . . ,12-n.

That is, since vacant periods are provided in order for each of the data disks 12-1 through 12-n, the access destination can be modified using this vacant period when there is a request to change a disk being an access destination. The vacant period can also be provided at shorter intervals.

Figure 6:
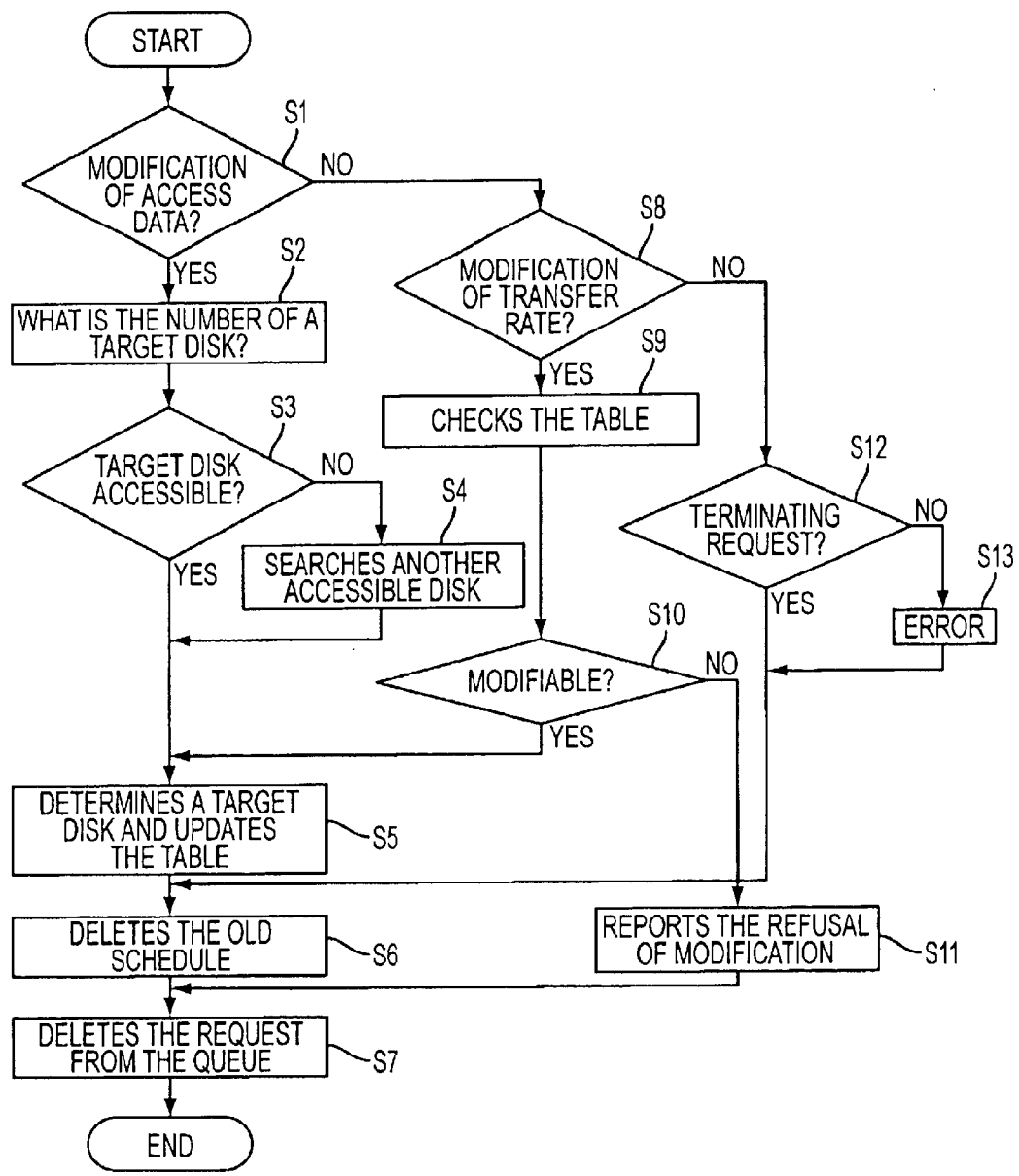
FIG. 6 is a flowchart at the time of a modification request.

Next, the process contents of the CPU 18 in the case where the reading source of data is modified using the above-mentioned vacant period are described with reference to the flowchart shown in FIG. 6.

When a modification request from a user is registered in a queue for storing requests in the order received, a request is made to the CPU 18. The CPU 18 judges whether or not the request registered in the queue is a modification of access data, that is, the modification of an access destination (FIG. 6, S1). If the request is a modification of an access destination, the flow proceeds to step S2, where the number of a data disk being an access destination is checked (S2). Then, the schedule table 21 is referred to, and it is judged whether or not the target data disk is idle (S3). If the target data disk is assigned to another user, the flow proceeds to step S4, where a local idle data disk is searched (S4).

As described above, in this embodiment, since a vacant period equivalent to two reading slots is provided for each data disk at every access cycle T, a slot for one out of n sets of data disks is vacant even if the target data disk is assigned to another user. For this reason, an access destination can be modified using the vacant slot. For example, when there is a modification request for the position of reproduction of the video data stored in data disks 12-1 through 12-n, there is no great difference on a user's monitor screen even if the position of reproduction is several frames before or after the target screen, and after that consecutive screens can be reproduced. Therefore, even if the target data disk is being used by another user, images of a quality acceptable for practical use can be reproduced by designating a local vacant slot as a new access destination.

When a data disk to be modified is determined, the user name of the modification requester is written in a user designating information storing area 21*b* corresponding to the disk designating information storing area 21*a*, where the disk designating information of the data disk to be modified in the schedule table 21 is stored (S5). Then, both the user name in the user designating information storing area 21*b* and the storage position information in the storage position storing area 21*c* of the schedule table 21 where the user name of the modification requester was written, are deleted (S6). Thus, since the slot which was assigned to the name of the modification requester becomes vacant, a vacant period equivalent to one reading slot can be secured.

If in step S1 it is judged that the request registered in the queue is not a modification request of access data, the flow proceeds to step S8, where it is judged whether or not the request is for the modification of a transfer rate. If the request is for the modification of a transfer rate, a vacant period in the schedule table is searched (S9). It is then judged whether or not the transfer rate is modifiable (S10). If there is a vacant period of a data disk that may be accessed in such an access cycle so as to satisfy the transfer rate required by the user, it is judged that an access schedule can be modified in step S10, the flow proceeds to the above-mentioned step S5, where a data disk to be modified is determined.

If in step S10 the data transfer rate required by the user cannot be satisfied, the flow proceeds to step S11, where it is reported to a requester that the access cannot be modified.

If in step S8 it is judged that the request registered in the queue is not for the modification of a transfer rate, the flow proceeds to step S12, where it is judged whether or not the request is for the termination. If the request is for the termination, the flow proceeds to the above-mentioned step S6, where the schedule of the relevant user in the schedule table 21 is deleted. If the request is not for the termination, the flow proceeds to step S13, where an error process is executed.

As described above, by providing a vacant period equivalent to at least one reading slot (in this embodiment two reading slots due to writing parity data) for each of data disks 12-1 through 12-n, the modification request of an access destination from a user can be met.

Next, the access timing with which a vacant period equivalent to two reading slots is provided in the schedule table 21, and parity data are written using the vacant period when calculating parity and writing parity data while reading data from data disks 12-1 through 12-n, is described below with reference to FIG. 5.

In this case, since a vacant period equivalent to two reading slots is provided for a data disk 12-3, there is a vacant period sufficient for two access requests, and to transfer two blocks of data in total to the bus when the access timing for the data disk 12-3 comes round, when the access timing for the data disk 12-3 comes round again after one cycle of access to the data disks 12-1 through 12-n, and when data are outputted from the data disk 12-3. Then, after sending out a reading request for reading from a one-previous data disk 12-2 to the bus, in succession the CPU 18 sends out a writing request for writing parity data to the bus, and instructs a redundant data controller 14 to send out parity data stored in a memory 17 to the bus. Thus, parity data are written in a redundant data disk 13 when there is a vacant period in the bus.

Thus, parity data can be written without affecting the access schedule for data disks 12-1 through 12-n. Since parity data can be written using a vacant period equivalent to two slots in the schedule table 21, there is no need to reduce the transfer rate of the bus to write the parity data, and thereby the efficiency of the transfer of the bus can be improved. Furthermore, since the CPU 18 can write parity data using a vacant period in the schedule table 21, the CPU can manage both the reading of data and the writing of parity data, plan a precise access schedule, and keep the schedule.

Figure 7:
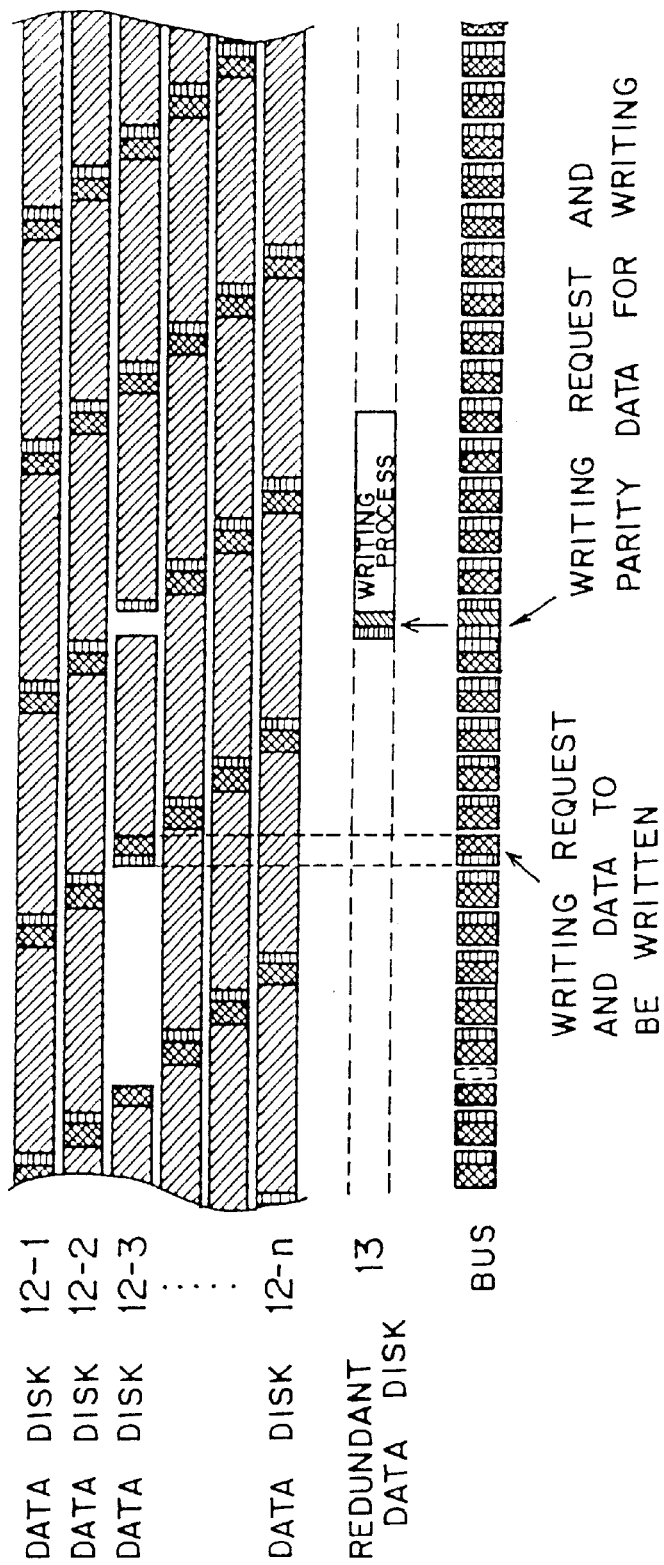
FIG. 7 shows the access timing in the case where the reading and writing, and the writing of parity data are carried out.

Next, the case where the writing of data and the writing of parity data can be carried out using a vacant period equivalent to two reading slots, is described below with reference to FIG. 7.

When a vacant period equivalent to one reading slot is provided in the schedule table 21, if a writing request is sent out to the bus to write data on a data disk 12-3, and successively data is sent to be written, and at the same time one block of data is sent out to the bus from the next data disk 12-4, both sets of data collide with each other on the bus, and thereby the data cannot be written.

On the other hand, if a vacant period equivalent to two reading slots, is provided, both the writing request for writing on the data disk 12-3 and the data to be written can be sent out to the bus, even after a writing request for writing on a data disk 12-2 has immediately before been sent out to the bus. That is, by providing a vacant period equivalent to two reading slots, data can be written without affecting an access schedule for another data disk of data disks 12-1 through 12-n.

Furthermore, in this embodiment, since a certain time allowance is secured from when a reading request for reading from one of data disks 12-1 through 12-n is sent out to the bus, until one block of data are sent out from the next data disk to the bus, another writing request can be sent out during the time allowance.

Since when the writing on the data disk 12-3 of data is completed, and the access timing for the data disk 12-3 comes round after one cycle of access to the data disks 12-1 through 12-n, there is a vacant period for transferring one block of data to the bus, parity data are written on a redundant data disk 13 using the vacant period. That is, the CPU 18 can write parity data on the redundant data disk 13 using the vacant period of the bus by sending out a writing request for writing on the redundant data disk 13 to the bus, and further instructing the redundant data controller 14 to send out the parity data to the bus after sending out a reading request for reading from a data disk 12-2 to the bus immediately before.

That is, since by providing a vacant period equivalent to two reading slots, a vacant period in time for transferring one block of data to the bus can be secured after the data are written, the CPU 18 can instruct the redundant data controller 14 to write parity data on the redundant data disk 13 using the vacant period.

Thus, parity data can be written without affecting the access schedule for another data disk among the data disks 12-1 through 12-n.

As described above, by the redundant data controller 14 calculating parity and writing the result of the operation in the memory 17, the load of the CPU 18 can be reduced. By the CPU 18 instructing the redundant data controller 14 to write the parity data on the redundant data disk 13, all the accesses to both the data disks 12-1 through 12-n and the redundant data disk 13 can be managed by the CPU 18.

Therefore, parity data can be written on the redundant data disk 13 without affecting the access schedule for the data disks 12-1 through 12-n. Since the CPU 18 can control the access schedule for both reading and writing data, and writing parity data, access schedules can be precisely managed, and the data transfer to the bus can be efficiently carried out.

Next, the allocation of users in the case of seven sets of data disks 12-1 through 12-7 is described below.

Figure 8:
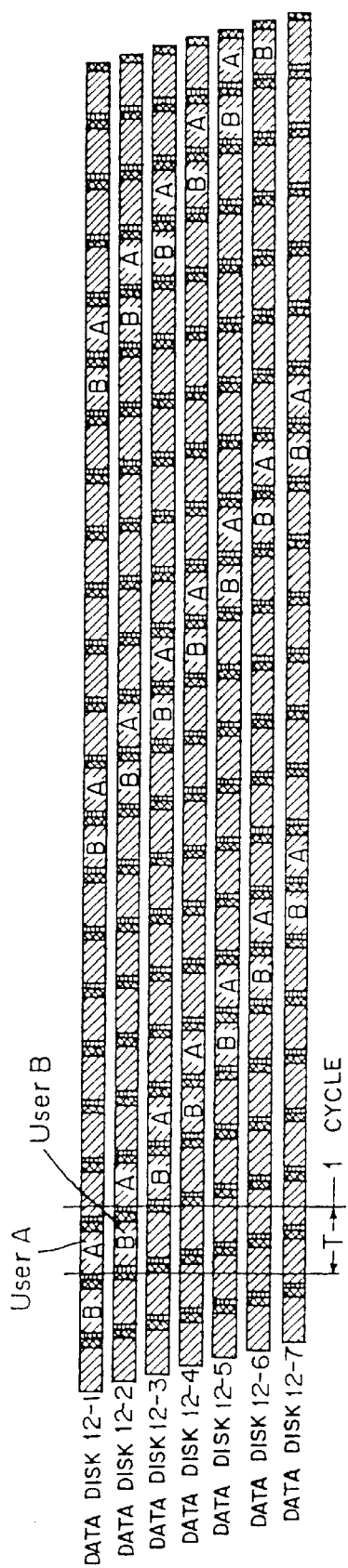
FIG. 8 shows the access timing in the case where the maximum number of users is "8".

FIG. 8 shows the access timing in the case where in a storing system having seven sets of data disks 12-1 through 12-7, one block of data is read from each of the data disks 12-1 through 12-7 in order.

In this case, since it is so configured that after one cycle of accesses to the seven sets of the data disks 12-1 through 12-7, the same user accesses the next data disk, the minimum access time is set for the access cycle T, and in this case, the maximum number of users becomes "8".

Figure 9:
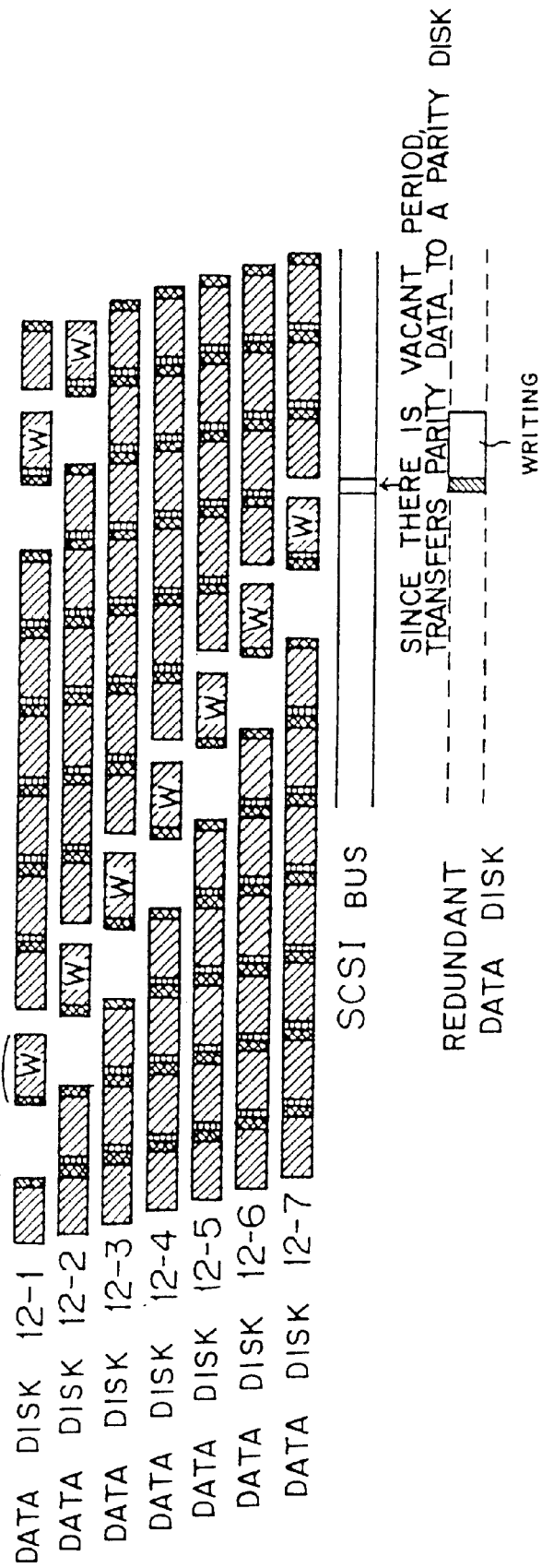
FIG. 9 shows the access timing in the case where a vacant period equivalent to two slots is provided.

Next, FIG. 9 shows the access timing in the case where in the same storing system having seven sets of data disks 12-1 through 12-7 as described above, a vacant period equivalent to two reading slots is provided. Data are written using this vacant period equivalent to two slots. In this case, since a vacant period for transferring data, equivalent to one reading slot is generated on the bus, parity data can be written on the redundant data disk 13 using this vacant period.

Figure 10:
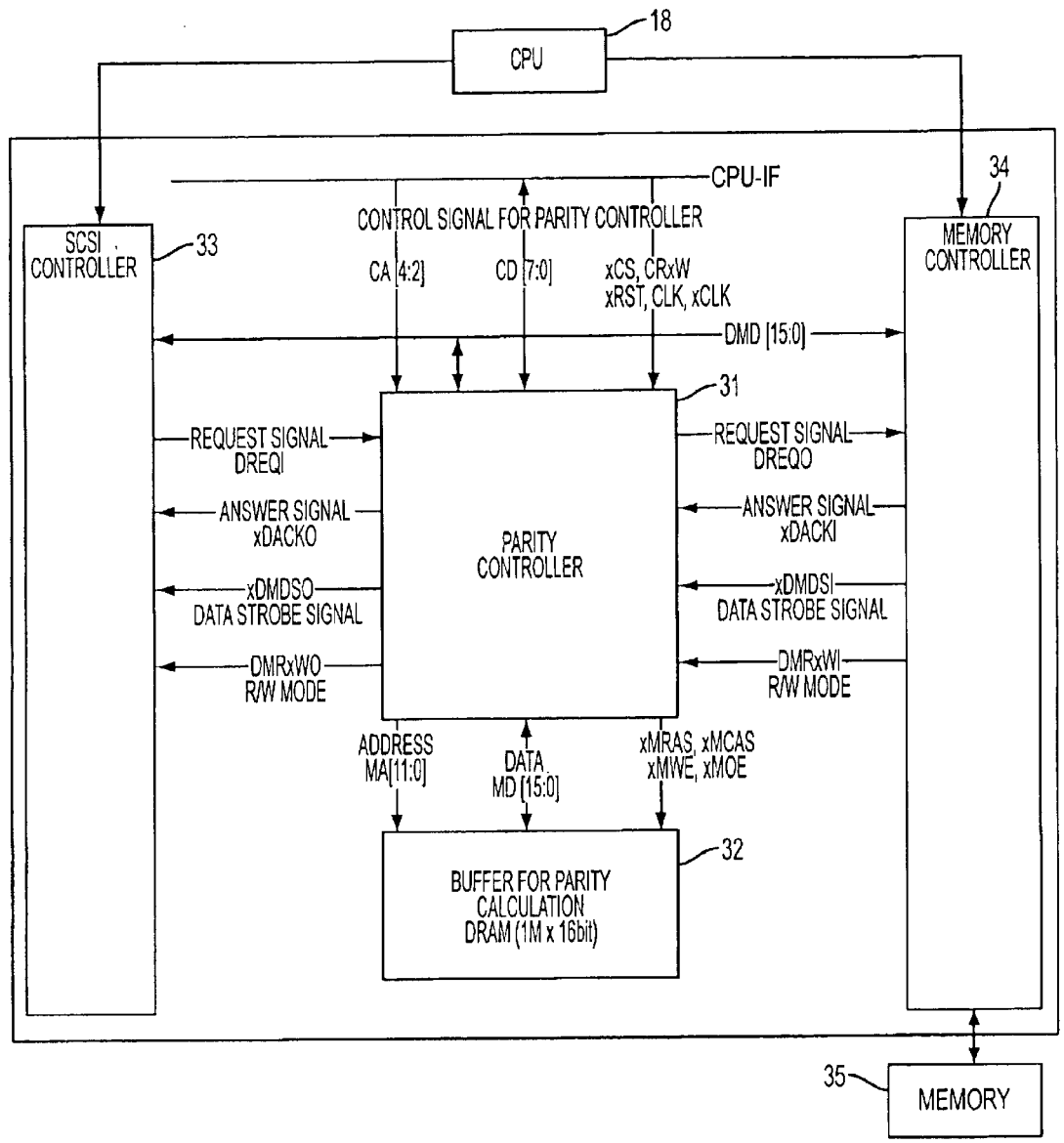
FIG. 10 shows an example of a redundant data controller.

Next, an example of a redundant data controller 14 is described below with reference to FIG. 10. The redundant data controller 14 comprises a parity controller 31 and a buffer for parity calculation 32. Although not shown in the drawing, a plurality of data disks 12-1 through 12-n are connected to a SCSI (small computer system interface) controller 33, which controls the reading from and writing on these data disks 12-1 through 12-n of data. In this example, a memory controller 34 stores data received through a network in a memory 35, and the DMA-transfer of the data in the memory 35 is carried out according to the instruction from the CPU 18.

Figure 11:
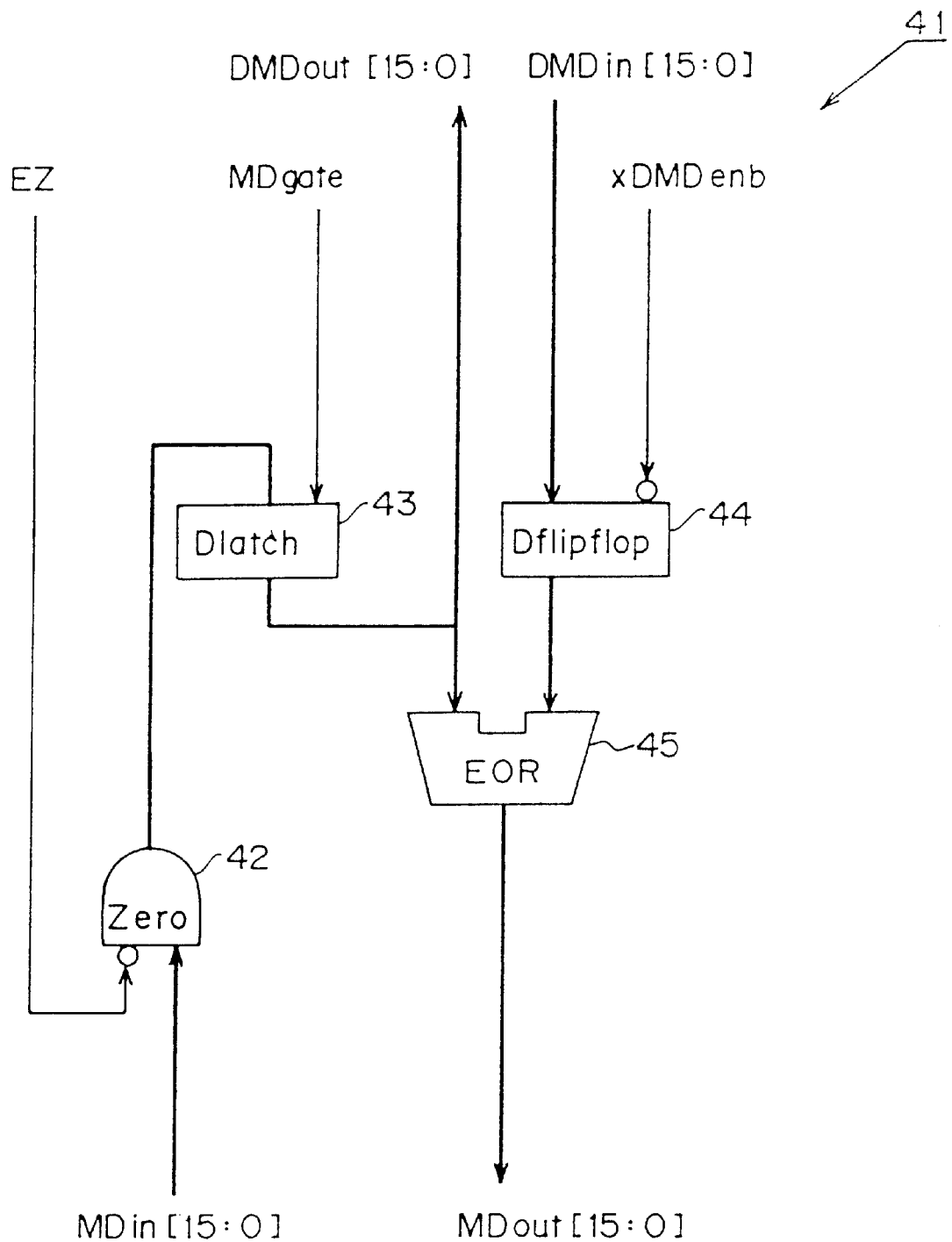
FIG. 11 shows the configuration of an exclusive-OR operator 41.
Figure 12:
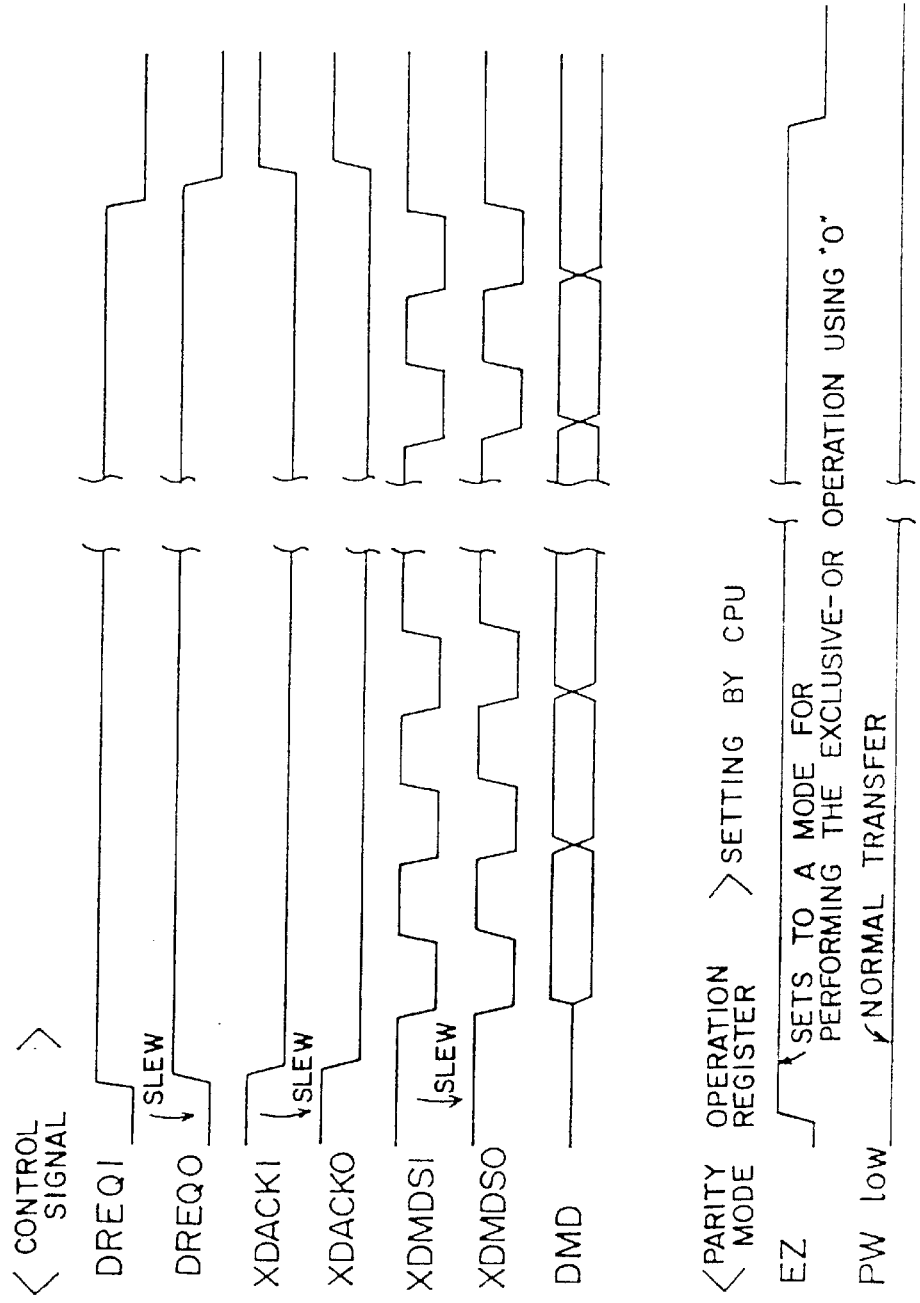
FIG. 12 is a chart showing the timing in the case where data are written on the first data disk 12-1.

Next, FIG. 11 shows the configuration of an exclusive-OR operator 41 in the parity controller 31.

This exclusive-OR operator 41 comprises a Zero output circuit 42 for outputting data MDin [15:0] read from the buffer for parity calculation 32 or "0" according to an EZ signal, a D latch 43 for storing parity data according to an MDgate signal while the exclusive-OR operation of the parity data read from the buffer for parity calculation 32 is performed, and the parity data are; written back to the buffer for parity calculation 32, or while the parity data are written in the redundant data disk 13 by the SCSI controller 33, a D flip-flop 44 for storing 16 bits of data outputted from the memory controller 34 to the bus synchronized with the rise of a clock signal CLK when an xDMDenb signal is at a low level, and an exclusive-OR (EOR) circuit 45 for performing the exclusive-OR operation of the output of the D latch 43 and the output of the D flip-flop 44. The EZ, MDgate and xDMDenb signals are signals generated in the parity controller 31 to control the entire sequence of the parity controller 31.

Next, the operation of the exclusive-OR operator 41 is described below.

The CPU 18 sets information for designating any of the parity operation modes, that is, a mode for initially writing data in the buffer for parity calculation 32, a mode for writing the result of the normal parity calculation, and a mode for writing the parity data in the buffer for parity calculation 32 in the redundant data disk 13 in the parity operation mode register of the parity controller 31.

For example, in the mode for initially writing data in the buffer for parity calculation 32, the Ez and PW signals are set to "1" and "0", respectively. When the EZ signal is "1", the Zero output circuit 42 outputs "0", and the D latch 43 latches the "0" and outputs "0" to the exclusive-OR circuit 45. The exclusive-OR circuit 45 performs the exclusive-OR operation on the "0" and data DMDin sent out to the bus, to be written in the data disks 12-1 through 12-n, and outputs the result of the operation to the buffer for parity calculation 32. As a result, the same data as written in the data disks 12-1 through 12-n are written in the buffer for parity calculation 32.

In the mode for writing the result of the normal parity calculation, the Ez and PW signals are set to "0" and "0", respectively. When the EZ signal is "0", the data MDin read from the buffer for parity calculation 32 are outputted from the Zero output circuit 42, which is latched by the D latch 43 and outputted to the exclusive-OR circuit 45. The exclusive-OR circuit, 45 performs the exclusive-OR operation on the data DMDin sent out to the bus to be written in the data disks 12-1 through 12-n and the MDin read from the buffer for parity calculation 32, the result of which are outputted to the buffer for parity calculation 32.

The operation of the parity controller 31 comprising the above-mentioned exclusive-OR operator 41 is described below with reference to the charts indicating the timing shown in FIGS. 12 through 15.

First, the case where one block of data is written on the first data disk 12-1 is described below. To write the data of the first one block in the buffer for parity calculation 32 as they are, the contents of the above-mentioned parity operation mode register are set by the CPU 18, and the EZ and PW signals become "1" and "0", respectively.

At this moment, when a high-level DMA (direct memory access) transfer request signal DREQI is outputted from the SCSI controller 33 to the parity controller 31, the parity controller 31 relays the signal and outputs a high-level DMA transfer request signal DREQO to the memory controller 34.

On the other hand, when a low-level DMA answer signal xDACKI is outputted, the parity controller 31 relays the signal and outputs a low-level DMA answer signal xDACKO to the SCSI controller 33.

Furthermore, when a data strobe signal xDMDSI for indicating a timing for fetching data is outputted, the parity controller 31 relays the signal and outputs a data strobe signal xDMDSO to the SCSI controller 33.

Thus, the DMA transfer of one block of data in the memory 35 is carried out and written on the first data disk 12-1.

At this moment, since the EZ and PW signals become "1" and "0",respectively, as described above, in the exclusive-OR operator 41 "0" is outputted from the Zero output circuit 42. Then, the exclusive-OR operation of the data DMDin transferred through the bus and written on the data disk 12-1 and the "0" outputted from the Zero output circuit 42 is performed, and the data written on the data disk 12-1 are written in the buffer for parity calculation 32 as they are.

Next, the case where one block of data is written on the second data disk 12-2 is described below. In this case, the operation of the DMA transfer request signal DREQI, DMA answer signal xDACKI, data strobe signal xDMDSI, etc. are the same as in the case where the data are written on the above-mentioned first data disk 12-1.

Figure 13:
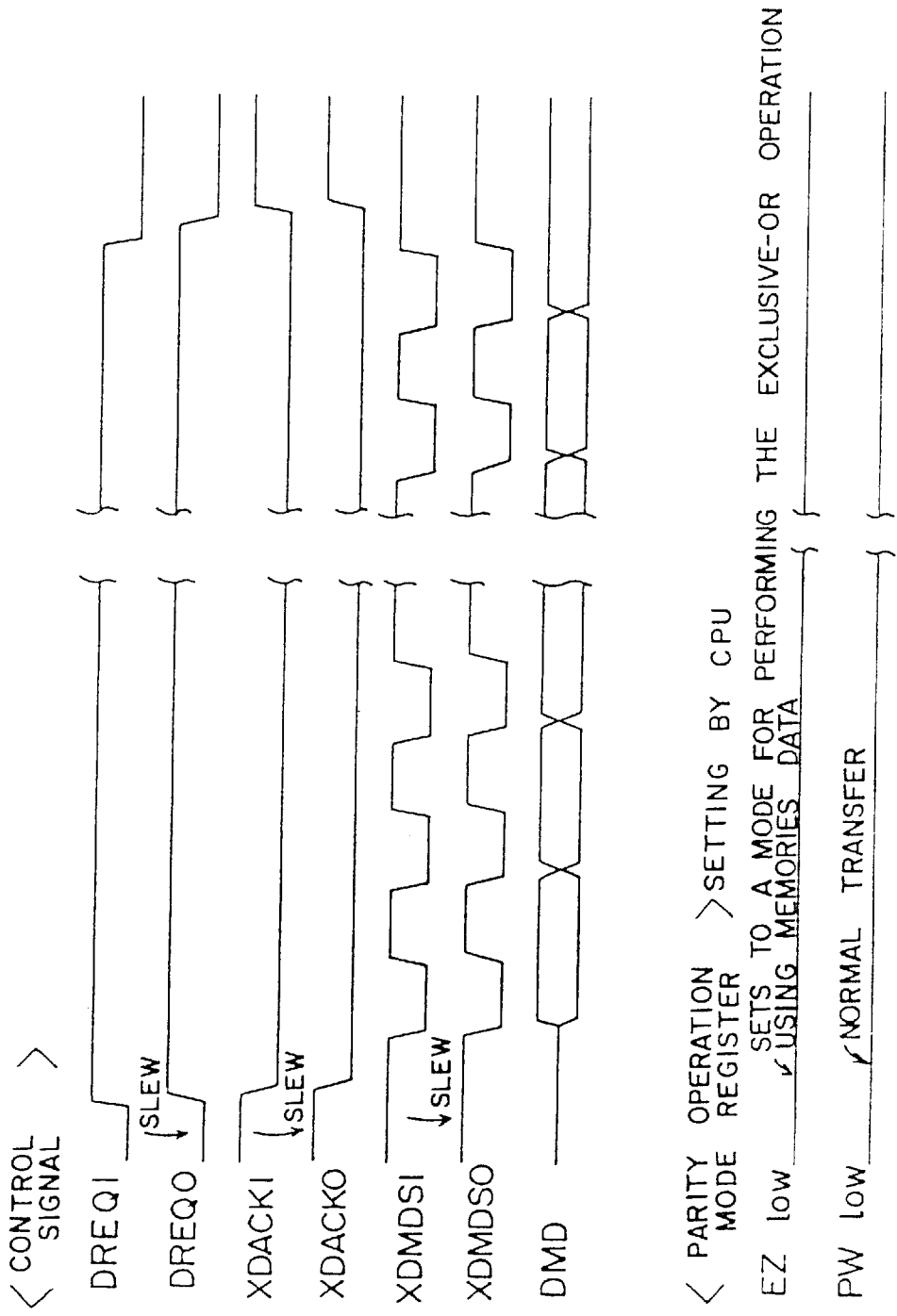
FIG. 13 is a chart showing the timing in the case where data are written on the second data disk 12-2.

In this case, the signal EZ is modified from "1" to "0" as shown in FIG. 13, and the mode is modified to a mode for performing the exclusive-OR of the parity data in the buffer for parity calculation 32 and the data on the bus. In this mode the parity data MDin stored in the buffer for parity calculation 32 are outputted from the Zero output circuit 42, and the exclusive-OR operation of the parity data and the data written in the second data disk 12-2 is performed by the exclusive-OR operator 45, the result of which is written back to the buffer for parity calculation 32.

Figure 14:
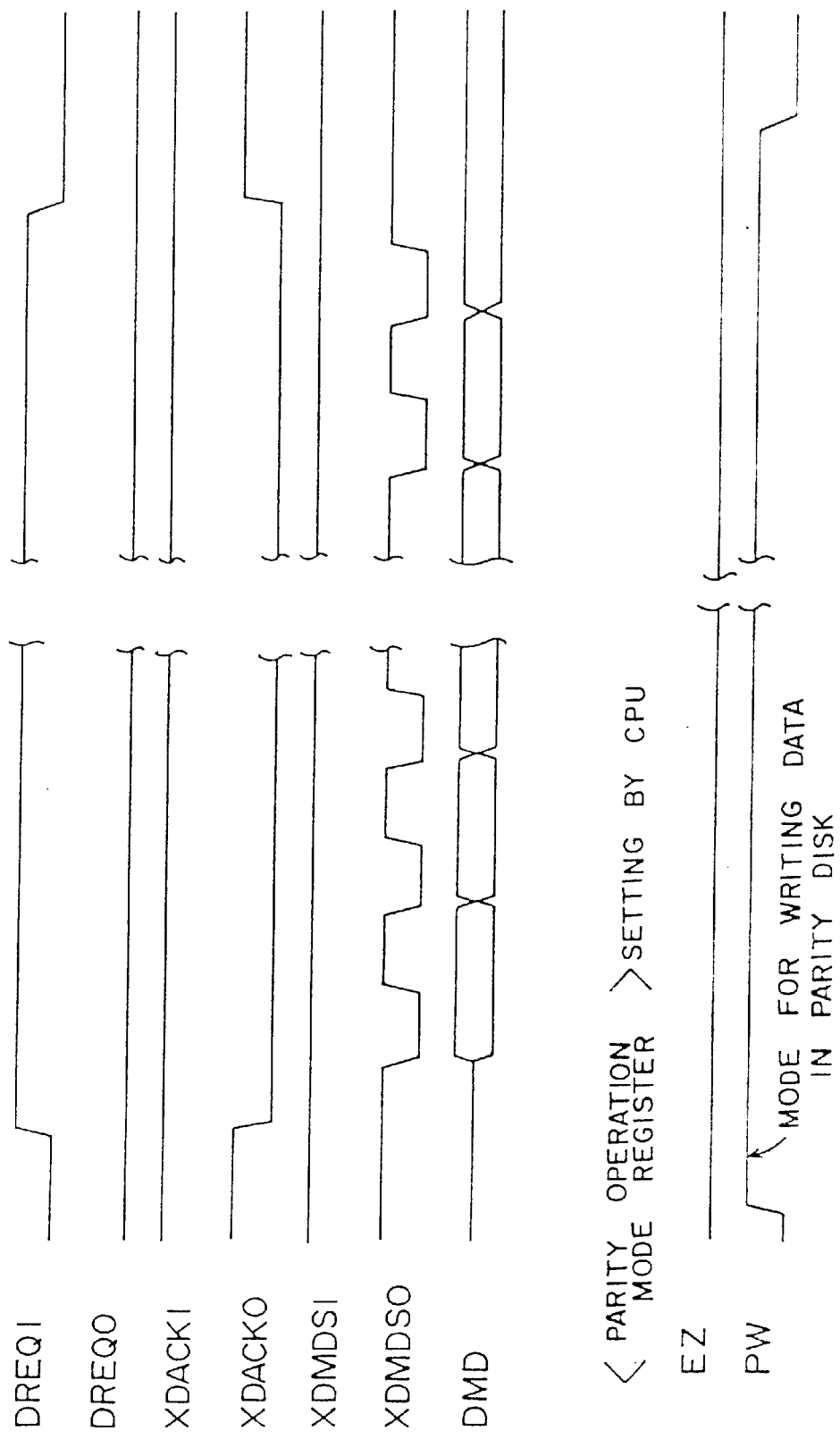
FIG. 14 is a chart showing the timing in the case where parity data are written on a redundant data disk 13.

Next, the operation in the case where the writing on the n-th data disk 12-n of one block of data is completed, and parity data are written in the redundant data disk 13, is described below with reference to FIG. 14.

In this case, the EZ and PW signals are set to "0" and "1", respectively by the CPU 18. When the PW signal is "1", the parity controller 31 is in a mode for writing parity data on the redundant data disk 13. When receiving a high-level DMA request signal DREQI from the SCSI controller 33, the parity controller 31 outputs a low-level DMA request signal DREQO to the memory controller 34, since this is not the transfer of data from the memory 35. Since this is not also the transfer of data from the memory controller 34, the DMA answer signal xDACKI outputted from the memory controller 34 becomes a high-level one.

On the other hand, since the parity controller 31 transfers the parity data in the buffer for parity calculation 32, the parity controller 31 outputs a low-level DMA answer signal xDACKO to the SCSI controller 33. Furthermore, the parity controller 31 outputs a data strobe signal xDMDSO to the SCSI controller 33, and sends out the parity data in the buffer for parity calculation 32 to the bus, synchronized with the data strobe signal xDMDSO. Thus, the parity data can be written on the redundant data disk 13.

FIG. 15 is a chart showing the timing at the time of writing data on data disks 12-1 to 12-n and of writing parity data on a redundant data disk 13.

When data are written on the first data disk 121, the parity operation mode register is so set by the CPU 18 that the PW and EZ signals become "0" and "1", respectively. When receiving a high-level DMA request signal DREQI from the SCSI controller 33, the parity controller 31 relays the signal, and outputs a high-level DMA request signal DREQO to the memory controller 34. When receiving a DMA answer signal xDACKI effective at a low level from the memory controller 34 for the DMA request signal DREQO, the parity controller 31 relays the signal, and outputs a low-level DMA answer signal xDACKO to the SCSI controller 33.

Then, when a data strobe signal xDMDS is outputted from the memory controller 34 to the SCSI controller 33 through the parity controller 31, the data read from the memory 35 are transferred to the data disk 12-1 with a timing synchronized with the data strobe signal xDMDS. At this moment, since the EZ and PW signals are "1" and "0", respectively, as described above, "0" is outputted from the Zero output circuit 42 of the exclusive-OR operator 41. Then, the exclusive-OR operation of the data DMDin written in the data disk transferred through the bus and the "0" outputted from the Zero circuit 42 is performed by the exclusive-OR circuit 45, the data written on data disk 12-1 are written in the buffer for parity calculation 32.

When the writing in the n-th data disk 12-n of one block of data is completed, the parity operation mode register is so set by the CPU 18 that the PW and EZ signals become "1" and "0", respectively.

Since the parity controller 31 is in a mode for writing parity data in the redundant data disk 13 when the PW and EZ signals are "1" and "0", respectively, the parity controller 31 outputs a low-level DMA answer signal xDMDS for the high-level DMA request signal DREQI from the SCSI controller 33. Furthermore, the parity controller 31 sends out the parity data read from the buffer for parity calculation 32 to the bus with a timing synchronized with the data strobe signal xDMDS. Thus, the SCSI controller 33 writes the parity data transferred through the bus in the redundant data disk 13.

As described above, the CPU 18 designates one of three modes such as a mode for writing data in the buffer for parity calculation 32 a mode initially, for writing the result of a normal parity calculation and a mode for writing the parity data of the buffer for parity calculation 32 on the redundant data disk 13, the parity controller 31 calculates parity according to the instructions from the CPU 18, the parity controller 31 writes back the result of the operation in the buffer for parity calculation 32, and further the parity controller 31 writes the parity data in the redundant data disk 13. Therefore, the CPU 18 can control both the timings for writing data on the data disks 12-1 through 12-n and for writing parity data on the redundant data disk 13.

Accordingly, the CPU 18 can control both the access schedules for the data disks 12-1 through 12-n and for the redundant data disk 13. Thus, the access to data disks 12-1 through 12-n cannot be disturbed by the writing of parity data. Since the CPU 18 manages schedules collectively, access schedules can be precisely planned, the schedules can be kept, and thereby the reliability of a system can be improved. Furthermore, since the CPU 18 controls the whole access schedule the access schedule can be so planned that the efficiency of the use of a bus may become the highest.

Although in the above-mentioned embodiment parity data are used to correct incorrect data, the present invention is not limited to this, and other redundant data as cyclic codes, hamming codes, etc. can also be used. Although the case where one block of data is stored in each data disk in order is described, the present invention can also be applied to data storing systems other than this. The SCSI controller 33 and the parity controller 31 can be incorporated, or the memory controller 34 can be incorporated with the parity controller 31.

Since the present invention is so configured that a redundant data controlling unit may calculate redundant data, and a controller may control both the writing to a data storing unit of data and the writing to a redundant data storing unit of redundant data, the writing of redundant data can be carried out without disturbing an access to a data storing unit. Since the controller can control both accesses to the data storing unit and to the redundant data storing unit, an access schedule can be so planned that the efficiency of the use of a bus may become the highest.

What is claimed is:

1. A system for storing data, comprising:

a data storing device;

a redundant data storing device;

a redundant data controller, having a redundant data calculating unit which calculates redundant data of data written to said data storing device, and a redundant data storing unit which stores the redundant data calculated by said redundant data calculating unit;

a processor controlling an access schedule so that writing of the redundant data to said redundant data storing device is performed during a period that said data storing device is not accessed for the writing of the data to or for the reading of the data from said data storing device.

2. A system for storing data, comprising:

a plurality of data storing devices;

a redundant data storing device;

a redundant data controller, having a redundant data calculating unit which calculates redundant data of block data written to said plurality of data storing devices, and a redundant data storing unit which stores the redundant data calculated by said redundant data calculating unit;

a processor controlling the dividing of data into a plurality of blocks and controlling an access schedule so that writing of the redundant data to said redundant data storing device is performed during a period that said data storing device is not accessed for the writing of the data to or for the reading of the data from said data storing device.

3. A method of controlling the writing of redundant data to a redundant data storing device when writing the redundant data of data written to a plurality of data storing devices, comprising:

controlling the reading from and writing to said plurality of data storing devices;

calculating the redundant data of data written to said plurality of data storing devices, and storing the redundant data obtained by the calculation by a redundant data controller, and controlling the writing to said redundant data storing device of said redundant data so that writing of the redundant data to said redundant data storing device is performed during a period that any of said plurality of data storing devices are not accessed for the writing of the data to or for the reading of the data from said plurality of data storing devices.

4. The method of controlling the writing of redundant data according to claim 3, providing a schedule table for managing access schedules for said plurality of data storing devices, wherein a vacant period equivalent to at least one slot is provided in said schedule table when a period for reading or writing one block of data in the plurality of data storing devices is assumed to be one slot, and said redundant data are written in said redundant data storing device using the vacant period.

5. A system for storing data, comprising:

a data storing device;

a redundant data storing device;

a redundant data controller, having a redundant data calculating unit which calculates redundant data of data written to said data storing device, and a redundant data storing unit which stores the redundant data calculated by said redundant data calculating unit;

a disk controller, which outputs data and redundant data to be written to said data storing device and to said redundant data storing device, and also outputs to a bus both data and redundant data read from said data storing device and said redundant data storing device; and a processor which controls an access schedule so that writing of the redundant data to said redundant data storing device is performed during a period that said data storing device is not accessed for the writing of the data to or for the reading of the data from said data storing device.

6. The system for storing data according to claim 5, wherein said processor comprises a schedule table for managing access schedules for said data storing device, and implements the writing to said redundant data storing device of said redundant data in a vacant period of said schedule table when access to said data storing device is not carried out.

7. The system for storing data according to claims 6, wherein when a period for reading or writing one block of data to said data storing device is assumed to be one slot, a vacant period equivalent to at least one block is provided in said schedule table, and said processor implements the writing to said redundant data storing device of said redundant data using the vacant period.

8. The system according to claim 6, wherein said processor implements the writing to said redundant data storing device of said redundant data using said vacant period after the writing to said data storing device of data.

9. A system for storing data, according to claim 6, wherein said processor sets vacant periods at prescribed intervals in said schedule table, the vacant periods within which access to said data storing device is not carried and causes said redundant data controller to write the redundant data to said redundant data storing device within said vacant periods.

10. The system storing data according to claim 5, wherein said redundant data storing unit is composed of memories, and the redundant data are calculated by said redundant data calculating unit and are written to the memories in said redundant data storing unit while one block of data in said data storing device is read or written.

11. The system for storing data according to claim 5, wherein said redundant data calculating unit calculates parity data of data written to said data storing device.

12. A system for storing data, comprising:

a plurality of data storing devices;

a redundant data storing device;

a redundant data controller, having a redundant data calculating unit which calculates redundant data of block data written to said plurality of data storing devices, and a redundant data storing unit which stores the redundant data calculated by said redundant data calculating unit;

a processor which divides data into a plurality of blocks and controls an access schedule so that writing of the redundant data to said redundant data storing device is performed during a period that said data storing device is not accessed for the writing of the data to or for the reading of the data from said data storing device.

\* \* \* \* \*